(12) United States Patent
Weder

(10) Patent No.: US 6,430,870 B1
(45) Date of Patent: *Aug. 13, 2002

(54) FLORAL SLEEVE HAVING A SHRINKABLE ELEMENT

(75) Inventor: Donald E. Weder, Highland, IL (US)

(73) Assignee: Southpac Trust International, Inc.

(*) Notice: Subject to any disclaimer, the term of this patent is extended or adjusted under 35 U.S.C. 154(b) by 0 days.

This patent is subject to a terminal disclaimer.

(21) Appl. No.: 09/955,904

(22) Filed: Sep. 19, 2001

Related U.S. Application Data

(63) Continuation-in-part of application No. 09/621,605, filed on Jul. 21, 2000, now Pat. No. 6,363,657, which is a continuation of application No. 09/146,162, filed on Sep. 2, 1998, now Pat. No. 6,105,310, which is a continuation-in-part of application No. 09/064,460, filed on Apr. 22, 1998, now Pat. No. 6,151,830, which is a continuation-in-part of application No. 08/788,616, filed on Jan. 24, 1997, now Pat. No. 5,749,171, which is a continuation-in-part of application No. 08/237,078, filed on May 3, 1994, now Pat. No. 5,625,979.

(51) Int. Cl.[7] .................................................. A47G 7/08
(52) U.S. Cl. ......................................................... 47/72
(58) Field of Search .............................. 47/72; 206/423

(56) References Cited

U.S. PATENT DOCUMENTS

| | | | |
|---|---|---|---|
| 1,044,260 A | 11/1912 | Schloss | |
| 1,520,647 A | 12/1924 | Hennigan | |
| 1,794,212 A | 2/1931 | Snyder | |
| 2,323,287 A | 7/1943 | Amberg | 229/53 |
| 2,355,559 A | 8/1944 | Renner | 229/8 |
| 2,371,985 A | 3/1945 | Freiberg | 206/46 |
| 2,529,060 A | 11/1950 | Trillich | 117/68.5 |
| 2,648,487 A | 8/1953 | Linda | 229/55 |
| 2,774,187 A | 12/1956 | Smithers | 47/41 |
| 2,989,828 A | 6/1961 | Warp | 53/390 |
| 3,022,605 A | 2/1962 | Reynolds | 47/58 |

(List continued on next page.)

FOREIGN PATENT DOCUMENTS

| | | |
|---|---|---|
| AU | 4231978 | 6/1979 |
| BE | 654427 | 1/1965 |
| CH | 560532 | 4/1975 |
| DE | 1166692 | 3/1964 |
| DE | 3911847 | 10/1990 |
| EP | 0050990 | 5/1982 |
| EP | 0585579 A1 * | 3/1994 |
| EP | 0791543 | 8/1997 |
| FR | 1376047 | 9/1964 |
| FR | 2036163 | 12/1970 |
| FR | 2137325 | 12/1972 |

(List continued on next page.)

OTHER PUBLICATIONS

Speed Cover Brochure, "The Simple Solution For Those Peak Volume Periods", Highland Supply Corporation, ©1989.

"Speed Sheets and Speed Rolls" Brochure, Highland Supply Corporation, ©1990.

"Color Them Happy with Highlander Products" ©1992.

(List continued on next page.)

Primary Examiner—Peter M. Poon
Assistant Examiner—Jeffrey L. Gellner
(74) Attorney, Agent, or Firm—Dunlap, Codding & Rogers, P.C.

(57) ABSTRACT

A plant packaging and covering system comprising a floral sleeve having a base portion and skirt portion. The sleeve comprises a shrinkable element constructed of a material shrinkable by heating or other means, wherein when the shrinkable element is caused to shrink, a constricted area is formed in the sleeve to help secure the sleeve in a position about a pot, floral grouping, or growing medium disposed therein. The sleeve may have an upper portion which can surround and protect a plant disposed in a pot and which can be detached once the protective function of the upper portion has been completed, thereby allowing the skirt portion to extend from the base portion. The sleeve may have a plurality of expansion elements in the base portion, or may lack such expansion elements.

37 Claims, 3 Drawing Sheets

U.S. PATENT DOCUMENTS

| | | | |
|---|---|---|---|
| 3,094,810 A | 6/1963 | Kalpin | 47/37 |
| 3,121,647 A | 2/1964 | Harris et al. | 118/202 |
| 3,271,922 A | 9/1966 | Wallerstein et al. | 53/3 |
| 3,322,325 A | 5/1967 | Bush | 229/62 |
| 3,376,666 A | 4/1968 | Leonard | 47/41 |
| 3,431,706 A | 3/1969 | Stuck | 53/390 |
| 3,512,700 A | 5/1970 | Evans et al. | 229/53 |
| 3,550,318 A | 12/1970 | Remke et al. | 47/37 |
| 3,556,389 A | 1/1971 | Gregoire | 229/53 |
| 3,557,516 A | 1/1971 | Brandt | 53/14 |
| 3,767,104 A | 10/1973 | Bachman et al. | 229/7 |
| 3,869,828 A | 3/1975 | Matsumoto | 47/34.11 |
| 3,962,503 A | 6/1976 | Crawford | 428/40 |
| 4,043,077 A | 8/1977 | Stonehocker | 47/66 |
| 4,091,925 A | 5/1978 | Griffo et al. | 206/423 |
| 4,113,100 A | 9/1978 | Soja et al. | 206/602 |
| 4,118,890 A | 10/1978 | Shore | 47/28 |
| 4,189,868 A | 2/1980 | Tymchuck et al. | 47/84 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,333,267 A | 6/1982 | Witte | 47/84 |
| 4,347,686 A | 9/1982 | Wood | 47/73 |
| 4,400,910 A | 8/1983 | Koudstall et al. | 47/84 |
| 4,413,725 A | 11/1983 | Bruno et al. | 206/45.33 |
| D279,279 S | 6/1985 | Wagner | D11/143 |
| 4,621,733 A | 11/1986 | Harris | 206/423 |
| 4,640,079 A | 2/1987 | Stuck | 53/390 |
| 4,733,521 A | 3/1988 | Weder et al. | 53/580 |
| 4,773,182 A | 9/1988 | Weder et al. | 47/72 |
| 4,801,014 A | 1/1989 | Meadows | 206/423 |
| 4,835,834 A | 6/1989 | Weder | 29/525 |
| D301,991 S | 7/1989 | Van Sant | D11/149 |
| 4,911,772 A | 3/1990 | Hoffman | 156/86 |
| 4,941,572 A | 7/1990 | Harris | 206/423 |
| 4,989,396 A | 2/1991 | Weder et al. | 53/397 |
| D315,700 S | 3/1991 | Stephens | D11/151 |
| 5,005,760 A * | 4/1991 | van den Hoogen | 229/125.38 |
| 5,073,161 A | 12/1991 | Weder et al. | 493/154 |
| 5,074,675 A | 12/1991 | Osgood | 383/122 |
| 5,105,599 A | 4/1992 | Weder | 53/399 |
| 5,111,638 A | 5/1992 | Weder | 53/397 |
| 5,120,382 A | 6/1992 | Weder | 156/212 |
| 5,152,100 A | 10/1992 | Weder et al. | 47/72 |
| 5,181,364 A | 1/1993 | Weder | 53/397 |
| D335,105 S | 4/1993 | Ottenwalder et al. | D11/164 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,307,606 A | 5/1994 | Weder | 53/410 |
| 5,353,575 A | 10/1994 | Stepanek | 53/461 |
| 5,361,482 A | 11/1994 | Weder et al. | 29/469 |
| 5,388,695 A | 2/1995 | Gilbert | 206/423 |
| 5,428,939 A | 7/1995 | Weder et al. | 53/397 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| 5,526,932 A | 6/1996 | Weder | 206/423 |
| 5,551,570 A | 9/1996 | Shaffer et al. | 206/575 |
| 5,572,851 A | 11/1996 | Weder | 53/399 |
| 5,617,703 A | 4/1997 | Weder | 53/413 |
| 5,624,320 A | 4/1997 | Martinez | 472/51 |
| 5,625,979 A * | 5/1997 | Weder | 47/72 |
| 5,647,168 A | 7/1997 | Gilbert | 47/72 |
| 5,647,193 A | 7/1997 | Weder et al. | 53/465 |
| 5,715,944 A | 2/1998 | Windisch | 206/423 |
| 5,749,171 A * | 5/1998 | Weder | 47/72 |
| D404,684 S | 1/1999 | Shea | D11/164 |
| 5,974,730 A | 11/1999 | Chien | 47/41.01 |
| D419,436 S | 1/2000 | Celtorius et al. | D9/305 |
| 6,105,310 A * | 8/2000 | Weder | 47/72 |
| 6,129,208 A | 10/2000 | Ferguson | 206/423 |
| 6,129,209 A | 10/2000 | Tchira | 206/423 |
| 6,151,830 A * | 11/2000 | Weder | 47/72 |
| 6,339,900 B1 * | 1/2002 | Weder | 47/72 |

FOREIGN PATENT DOCUMENTS

| | | |
|---|---|---|
| FR | 2272914 | 12/1975 |
| FR | 2567068 | 1/1986 |
| FR | 2567068 A1 * | 1/1986 |
| FR | 2603159 | 3/1988 |
| FR | 2603159 A1 * | 3/1988 |
| FR | 2610604 | 8/1988 |
| FR | 2603159 | 3/1989 |
| FR | 2619698 | 3/1989 |
| GB | 2056410 | 3/1981 |
| GB | 2074542 | 11/1981 |
| GB | 2128083 | 4/1984 |
| GB | 2252808 | 8/1992 |
| IT | 224507 | 4/1996 |
| JP | 8-19334 * | 1/1996 |
| NL | 8301709 | 12/1984 |
| NL | 1000658 | 1/1996 |
| WO | 9315979 | 8/1993 |

OTHER PUBLICATIONS

"Costa Keeps the Christmas Spirit", Supermarket Floral, Sep. 15, 1992.
"Super Seller", Supermarket Floral, Sep. 15, 1992.
"Halloween", Link Magazine, Sep. 1992.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Stand Alone Plastic Bagmaking" brochure, AMI, Atlanta, GA, Feb. 15, 1996, 2 pages.
"Foil Jackets" brochure, Custom Medallion, Inc., Dec., 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.
"Special Occasion Printed Highlophane Bags" Brochure, Highland Supply Corporation, 1990, 2 pgaes.
"Creative Packaging" Brochure, John Henry Company, Sep. 1992.
"Make Highlander Your Headquarters" Brochure, Highland Supply Corporation, 1991.

* cited by examiner

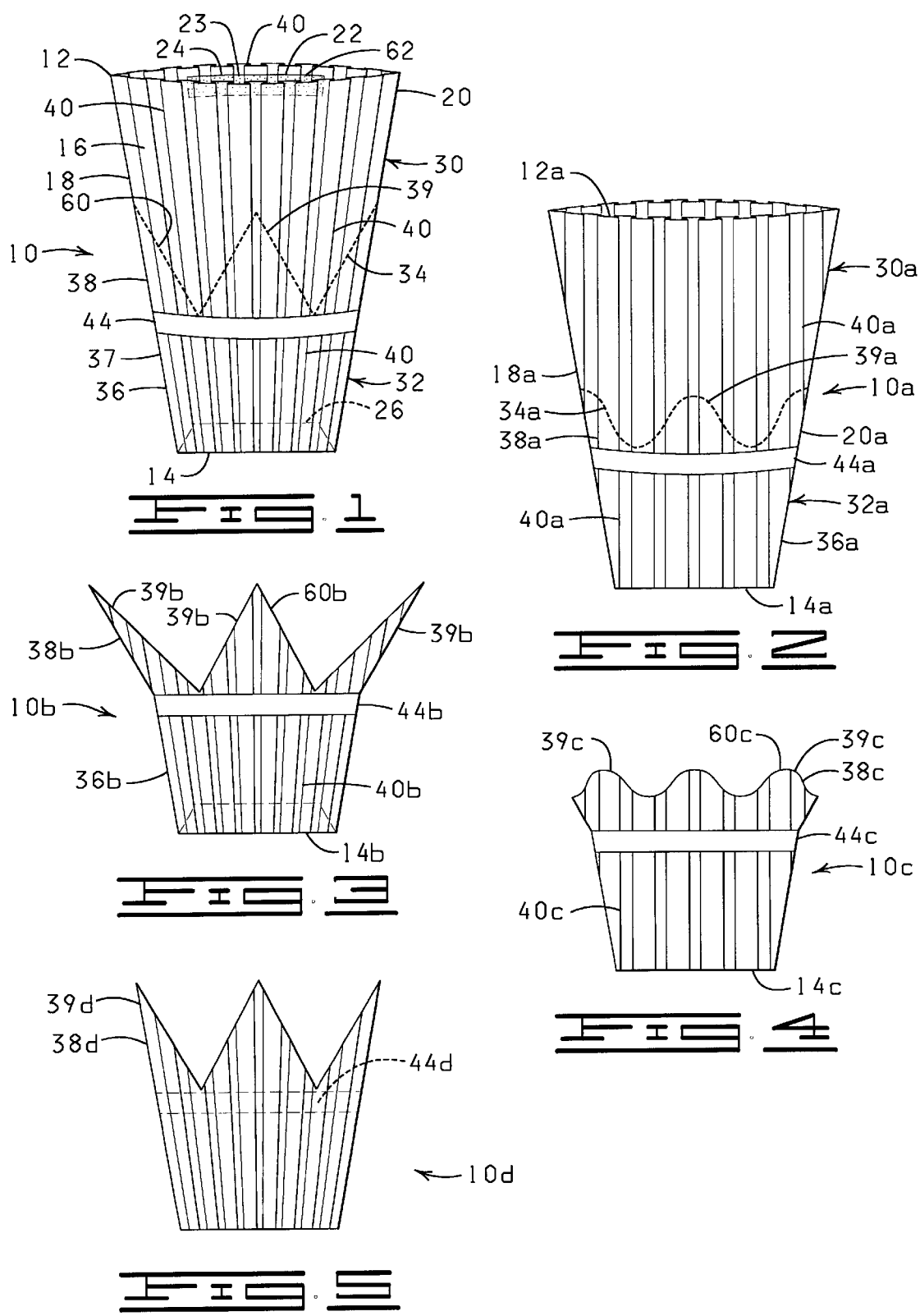

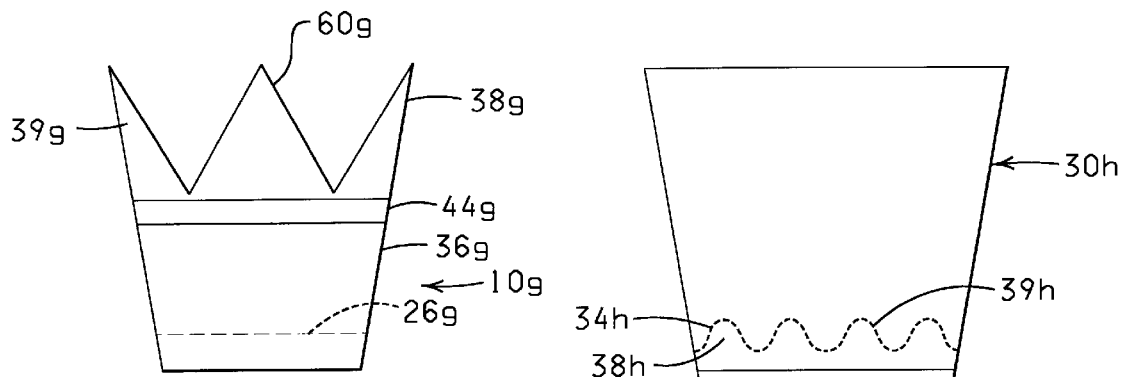
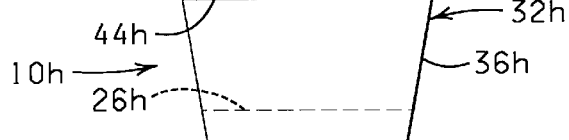
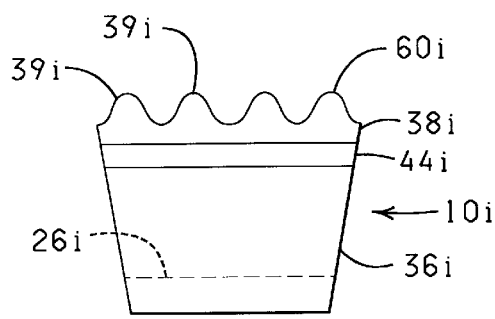
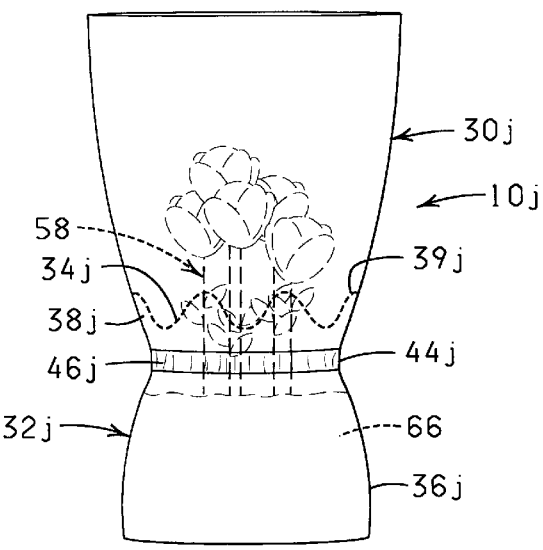

FLORAL SLEEVE HAVING A SHRINKABLE ELEMENT

CROSS REFERENCE TO RELATED APPLICATIONS

The present application is a continuation-in-part of U.S. Ser. No. 09/621,605, filed Jul. 21, 2000, now U.S. Pat. No. 6,363,657 which is a continuation of U.S. Ser. No. 09/146,162 filed Sep. 2, 1998, now U.S. Pat. No. 6,105,310 issued Aug. 22, 2000, which is a continuation-in-part of U.S. Ser. No. 09/064,460, filed Apr. 22, 1998, now U.S. Pat. No. 6,151,830 issued Nov. 28, 2000, which is a continuation-in-part of U.S. Ser. No. 08/788,616 filed Jan. 24, 1997, now U.S. Pat. No. 5,749,171 issued May 12, 1998, which is a continuation-in-part of U.S. Ser. No. 08/237,078, filed May 3, 1994, now U.S. Pat. No. 5,625,979 issued May 6, 1997. Each of these applications is hereby incorporated by reference herein in its entirety.

BACKGROUND

This invention generally relates to sleeves, and more particularly, to sleeves used to wrap flower pots containing floral groupings and/or mediums containing floral groupings, and methods of using same.

The floral industry has long been plagued by the conflicting goals of providing a protective covering for plants contained within pots (potted plants) which can be held securely about the pot, yet which also provides an attractive, decorative covering for the potted plant. A potted plant can be disposed within a traditional floral sleeve sized to fit closely to the pot, yet such floral sleeves generally fit only one pot size. Larger floral sleeves may be sized to fit a variety of pot sizes, yet such sleeves often do not fit securely about the pot and may easily fall away from the plant, thus defeating the purpose of the sleeve.

U.S. Pat. No. 4,941,572 issued to Harris, attempts to solve this problem by placing a bottomless film shell over a potted plant and heat shrinking a lower portion of the shell about the pot. However, the heat-shrunk lower portion of the film shell must still be attached by an adhesive tape about the pot to secure the shell about the pot.

A floral sleeve which is heat shrinkable about a potted plant and which requires no additional securing device would be a desirable solution to the problem of providing a protective and/or decorative covering.

BRIEF DESCRIPTION OF THE DRAWINGS

FIG. 1 is a perspective view of a sleeve having a shrink band, a gusset and an upper detachable portion constructed in accordance with the present invention.

FIG. 2 is a perspective view of another sleeve having a shrink band and an upper detachable portion constructed in accordance with the present invention.

FIG. 3 is an elevational view of a sleeve having a shrink band and a gusset and without an upper detachable portion and constructed in accordance with the present invention.

FIG. 4 is an elevational view of another sleeve constructed in accordance with the present invention.

FIG. 5 is an elevational view of a sleeve having a shrink band on an inner surface thereof.

FIG. 10 is an elevational view of a sleeve similar to the sleeve of FIG. 9 except without an upper detachable portion.

FIG. 11 is an elevational view of a sleeve like the sleeve of FIG. 9 but having a different perforation pattern.

FIG. 12 is an elevational view of another version of a sleeve which is similar to the sleeve of FIG. 11 except it is constructed without a detachable upper portion.

FIG. 13 is a cross-sectional view of a sleeve containing a growing medium and floral grouping.

DESCRIPTION OF THE PREFERRED EMBODIMENTS

Figure 6:
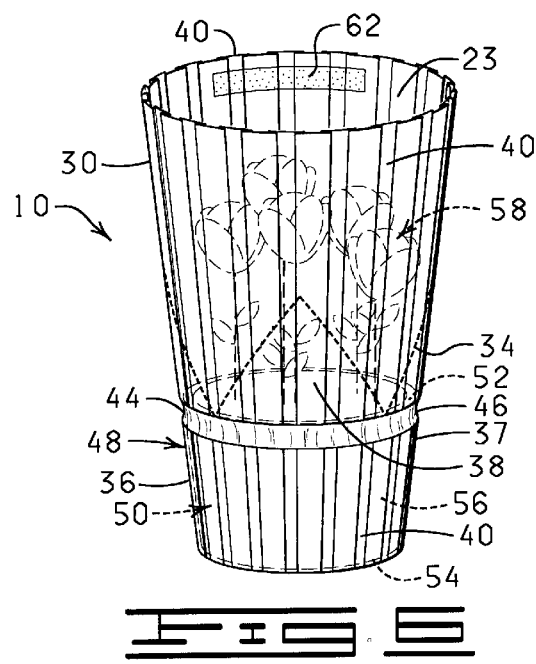
FIG. 6 is a perspective view of an opened version of the sleeve of FIG. 1 having a potted plant disposed therein.

The present invention contemplates a preformed sleeve (also referred to herein as sleeve) for covering a pot having an upper end, a lower end, and an outer peripheral surface. The preformed sleeve comprises a base portion having an upper end, a lower end, and an interior space. A skirt portion generally extends from the upper end of the base portion. The sleeve may comprise extension (or expansion) elements which comprise a plurality of folds in the base portion and in the skirt portion. The sleeve further comprises a shrinkable material which in a preferred embodiment is made up of a band or area of a shrink wrap or heat shrinkable material in the base portion near the lower end of the skirt portion. The shrinkable material may also comprise a portion of the skirt portion. The shrinkable material may extend entirely circumferentially about the base portion, or may extend only partially circumferentially about the base portion. The shrinkable material can be shrunk by a heat source to constrict or crimp a portion of the base portion or skirt portion such that when a pot is disposed within the sleeve, the sleeve is held or secured about the pot. The preformed sleeve may further comprise a detachable upper portion generally sized to enclose a floral grouping and which when detached leaves the skirt portion and base portion about the pot. The upper portion, when present, may be detachable via perforations, tear strips, weakened areas, or zippers. The upper portion may have an extended portion for serving as a handle or support device. The folds or expansion elements, when present, may extend the entire length from the lower end of the base portion to the upper end of the sleeve or may extend only an intermediate distance therebetween.

The expansion elements, when present, may be a plurality of vertical pleats, a plurality of vertical folds each having a Z-shaped cross section, a plurality of vertical accordion-type folds, or other similar types of expandable structures.

The preformed sleeve may form part of a plant package when used in conjunction with a pot disposed within the interior space of the base portion of the preformed sleeve, the pot generally having a floral grouping disposed therein, and wherein the pot is substantially surrounded and encompassed by the base portion and the floral grouping is substantially surrounded and encompassed and enclosed by the upper portion when it forms a part of the preformed sleeve.

The base portion and the skirt portion of the preformed tubular sleeve may be constructed from a first material and the upper portion constructed from a second material different from the first material. The base portion and the upper portion of the preformed sleeve may be constructed from a first material and the skirt portion constructed from a second material different from the first material.

These embodiments and others of the present invention are now described in more detail below. It will be appreciated that the examples provided herein are not intended to limit the scope and extent of the claimed invention but are only intended to exemplify various embodiments of the invention contemplated herein.

The Embodiments and Methods of Use of FIGS. 1–13

Shown in FIG. 1 and designated therein by the general reference numeral 10 is a flexible preformed sleeve (also referred to herein simply as a sleeve) of unitary construction. The sleeve 10 preferably initially has a flattened condition which is openable into the form of a tube or sleeve. In an alternative embodiment, the sleeve 10 may be formed to have an opened frusto-conical configuration. The sleeve 10 is preferably tapered outwardly from the lower end toward a larger diameter at its upper end. In its flattened condition the sleeve 10 has an overall trapezoidal or modified trapezoidal shape, and when opened is substantially frusto-conical. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

The sleeve 10 has an upper end 12, a lower end 14, an outer peripheral surface 16 and in its flattened condition has a first side 18 and a second side 20. The sleeve 10 has an opening 22 at the upper end 12 and may, in an alternate version, be open at the lower end 14 (not shown), or closed with a bottom at the lower end 14. The sleeve 10 also has an inner peripheral surface 24 which, when the sleeve 10 is opened, defines and encompasses an inner retaining space 23. When the lower end 14 of the sleeve 10 is closed, a portion of the lower end 14 may be inwardly or outwardly folded to form one or more gussets 26 constructed in a manner well known to one of ordinary skill in the art as shown in FIG. 1 for permitting a bottom of an object such as a potted plant (FIGS. 6 and 7) to be disposed into the inner retaining space 23 of the lower end 14 of the sleeve 10. Further, the lower end 14 may be constructed in the manner shown in U.S. Pat. No. 6,182,395, the specification of which is hereby expressly incorporated herein in its entirety. FIG. 2 shows a sleeve 10a formed without a gusset in the lower end 14a.

Figure 7:
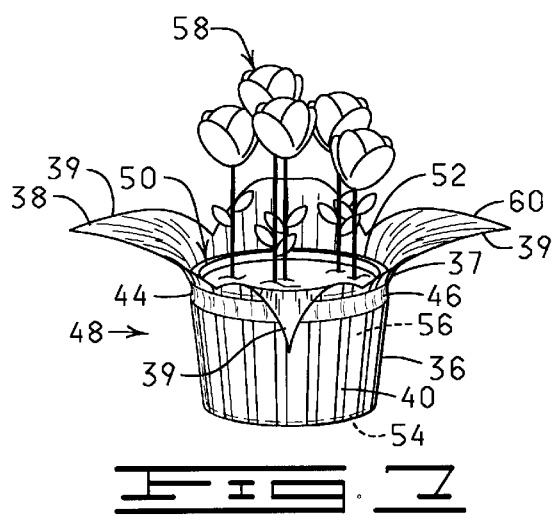
FIG. 7 is a perspective view of a potted plant covered by a sleeve such as the sleeve of FIG. 3.

As shown in FIG. 1, the sleeve 10 in one embodiment is demarcated into an upper portion 30 and a lower portion 32. The lower portion 32 of the sleeve 10 is generally sized to contain a pot 50 (FIGS. 6 and 7). The upper portion 30 of the sleeve 10 is sized to substantially surround and encompass a floral grouping 58 contained within the pot 50 disposed within the lower portion 32 of the sleeve 10. The sleeve 10 is demarcated into the upper portion 30 and the lower portion 32 by a detaching element 34 for enabling the detachment of the upper portion 30 of the sleeve 10 from the lower portion 32 of the sleeve 10. In the present version, the detaching element 34 is preferably a plurality of generally curved, scalloped, laterally-oriented or alternatingly diagonally-oriented perforations which extend circumferentially across the outer peripheral surface 16 of the sleeve 10 from the first side 18 to the second side 20. The term "detaching element," as used generally herein, means any element, or combination of elements, or features, such as, but not by way of limitation, perforations, tear strips, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith.

The lower portion 32 of the sleeve 10 further comprises a base portion 36, and a skirt portion 38. The base portion 36 comprises that part of the lower portion 32 which, when the pot 50 is placed into the lower portion 32, has an inner peripheral surface 24 which is substantially adjacent to and surrounds an outer peripheral surface 56 of the pot 50. The skirt portion 38 comprises a plurality of petal portions 39 of the lower portion 32 which extend beyond an upper rim 52 of the pot 50 and adjacent at least a portion, generally a lower portion, of the floral grouping 58 contained within the pot 50 and which are left to freely extend at an angle, inwardly or outwardly, from the base portion 36 and has an outer peripheral edge 60 when the upper portion 30 of the sleeve 10 is detached from the lower portion 32 of the sleeve 10 by actuation of the detaching element 34. In FIG. 1, the upper peripheral edge 60 of the skirt portion 38 is congruent (before detachment) with a series of alternatingly diagonally-oriented lines of perforations which together form a zig-zag and comprise the detaching element 34.

The upper portion 30 of the sleeve 10 may also have an additional vertical detaching element comprising a plurality of vertical perforations (not shown) for facilitating removal of the upper portion 30 and which are disposed more or less vertically therein extending between the detaching element 34 of the sleeve 10 and the upper end 12. The upper portion 30 of the sleeve 10 is separable from the lower portion 32 of the sleeve 10 by tearing the upper portion 30 along both the vertical perforations (when present) and the detaching element 34, thereby separating the upper portion 30 from the lower portion 32 of the sleeve 10. The lower portion 32 of the sleeve 10 remains disposed as the base portion 36 about the pot 50 and as the skirt portion 38 about the floral grouping 58 forming a decorative cover 48 which substantially surrounds and encompasses the pot 50 and floral grouping 58.

As contemplated herein, and as shown in FIGS. 1, 6 and 7, the invention further comprises a shrinkable element 44 which is attached to or disposed about a portion of the inner peripheral surface 24, and/or the outer peripheral surface 16 of the base portion 36 of the sleeve 10. The shrinkable element 44 is preferably located at the upper end 37 of the base portion 36 below the skirt portion 38 and may extend completely or partially about the circumference of the sleeve 10. The shrinkable element 44 functions to constrict a portion of the base portion 36 when the shrinkable element 44 is shrunk, for example by exposure to heat from a heating device such as a blower, as is well known in the art, thereby constricting a portion of the sleeve 10 forming a constricted area 46 in the sleeve 10 (FIGS. 6 and 7). The shrinkable element 44 in a preferred version comprises a band, ribbon, string, strip, or tape constructed of a heat shrinkable material which is preferably, but not necessarily, pre-attached to a portion of the base portion 36. The shrinkable element 44 may be non-elastic or may comprise a degree of elasticity for enabling partial expansion of the shrinkable element 44 when sleeve 10 is placed about the pot 50 but before the shrinkable element 44 is shrunk.

As noted above, the sleeve 10 may have an open or closed lower end 14. When the lower end 14 is closed, the lower end 14 may have one or more gussets 26 formed therein such as that seen in sleeve 10 in FIG. 1 for allowing expansion of the lower end 14 when an object with a broad lower end such as the pot 50 is disposed therein. A strip of bonding material 62 may be disposed adjacent the upper end 12 of the sleeve 10 for allowing the upper end 12 to be sealed for enclosing the upper portion 30 of the sleeve 10 about the floral grouping 58 after it has been disposed therein. The bonding material 62 may be absent in any of the sleeves described herein. In another version of the present invention, a sleeve may comprise a flap (not shown) positioned at the upper end 12 which can be folded over and sealed with a flap bonding strip to an adjacent portion of the outer peripheral surface 16 of the sleeve 10 near the upper end 12 thereof. Other versions of the sleeve 10 (not shown) may comprise ventilation holes or drainage holes in the lower portion 32 for allowing movement of gases or moisture to and away from the inner retaining space 23 of the sleeve.

In another version of the present invention (not shown), the sleeve 10 may comprise an inner strip or area of a bonding material (not shown) disposed upon a portion of the inner peripheral surface 24 of the lower portion 32 which functions to enable the inner peripheral surface 24, or a portion thereof, to be bondingly connected to the outer peripheral surface 56 of the pot 50 disposed therein causing the sleeve 10 to be bondingly connected to the pot 50.

In another embodiment, a sleeve such as sleeve 10f, (FIG. 9) may further comprise apertures 64 in a portion thereof, which allow the sleeve 10f to be supported on a support assembly commercially available and known by one of ordinary skill in the art such as a pair of wickets (in one version) for shipment, storage, assembly of the sleeve 10f, placement of the pot 50 within the sleeve 10f, or other functions known in the art.

In another version of the invention (not shown), the sleeve 10 or any sleeve described herein may have an extended portion comprising a handle for carrying the pot 50 in the sleeve. The sleeve 10 may further comprise a detaching element (not shown) comprising perforations for removing the handle at a later time.

The sleeve 10 herein is further contemplated as having one or more expansion elements 40, for example comprising at least one vertically oriented fold which may extend from the upper end 12 to the lower end 14 of the sleeve 10.

The one or more expansion elements 40 generally extend at least from a portion of the base portion 36 to a portion of the skirt portion 38 and may extend into the upper portion 30 as shown in FIG. 1. The expansion element 40 function to allow expansion of a portion of the base portion 36 and of the skirt portion 38 of the sleeve 10 when the pot 50 is inserted into the inner retaining space 23 of the sleeve 10.

As shown in FIGS. 1 and 6, each expansion element 40 of the sleeve 10 may comprise one or more areas of excess material shaped in the form of a pleat which extends from the base portion 36 to the upper end 12 of the sleeve 10. As used herein, the term "excess material" means an amount of material which has a greater surface area than would actually be necessary to form that portion of the plant covering were that portion of the plant covering actually flattened. The expansion element 40 can expand thereby causing portions of the upper portion 30 and/or the skirt portion 38, in some embodiments, to extend angularly from the base portion 36.

The expansion element 40 in the sleeve 10 contemplated herein may be constructed in such a manner that each expansion element 40 extends completely from the lower end 14 of the sleeve 10 to the upper end 12 of the sleeve 10 as shown in FIGS. 1 and 6. Alternatively as shown in FIG. 2, the sleeve 10a may comprise expansion elements 40a which are parallel such that some of the expansion elements 40a extend the entire distance from an upper end 12a to a lower end 14a, while other expansion elements 40a, particularly those near the first side 18a and the second side 20a, extend from the upper end 12a only part of the distance toward the lower end 14a of the sleeve 10a and may intersect the first side 18a or the second side 20a. The expansion elements 40a in sleeve 10a are substantially parallel when the sleeve 10a is in the flattened condition. Henceforth the term "tapering folds" will be used in reference to the pattern of folds in the embodiment of sleeve 10 of FIG. 1 while the term "parallel folds" will be used in reference to the pattern of folds in the embodiment of sleeve 10a of FIG. 2. Sleeve 10a further comprises an upper portion 30a, a lower portion 32a comprising a base portion 36a, a skirt portion 38a having petal portions 39a, a shrinkable element 44a and a non-linear detaching element 34a.

Attention is now drawn to the embodiment of the present invention designated by reference numeral 10b in FIG. 3. Sleeve 10b is constructed without a detachable upper portion. Sleeve 10b has tapered expansion elements 40b and has a skirt portion 38b having an outer peripheral edge 60b and petal portions 39b and which in the flattened condition extends at an angle from the base portion 36b. Sleeve 10b has a shrinkable element 44b similar to the shrinkable element 44 which is externally disposed, however the shrinkable element 44b may also be disposed internally upon an inner peripheral surface (not shown) of the base portion 36b in the same manner as described for shrinkable element 44 of sleeve 10.

The sleeve of FIG. 4 designated by the reference numeral 10c is similar to the sleeve 10b except it has expansion elements 40c which are parallel, and has a lower end 14c which has a straight seal rather than a gusset. It will of course be understood by a person of ordinary skill in the art that sleeve 10c may be formed with a gusseted in the lower end 14c, and that sleeve 10b may be formed without a gusset in a lower end 14b thereof. Sleeve 10c also has a skirt portion 38c with petal portions 39c which has an outer peripheral edge 60c having a non-linear pattern, and a shrinkable element 44c similar to the shrinkable element 44.

Shown in FIG. 5 is a sleeve 10d which exemplifies a sleeve embodiment wherein an area can be constricted internally by a shrinkable element 44d attached to an inner peripheral surface (not shown) of the sleeve 10d. Sleeve 10d has a skirt portion 38d having petal portions 39d. Any of the other sleeves described herein can be constructed in a similar manner.

Referring again to FIGS. 6 and 7, the sleeve 10 of FIG. 1 is shown as having the pot 50 disposed therein (the pot 50 in phantom view). As noted previously, the pot 50 has an upper rim 52, a lower end 54, and an outer peripheral surface 56, and has a floral grouping (or plant) 58 disposed therein. The upper portion 30 of the sleeve 10 surrounds and generally encompasses the floral grouping 58. When the upper portion 30 is detached along the detaching element 34, the skirt portion 38 extends away from the upper end 37 of the base portion 36, for example in a manner as shown in FIG. 7, which shows a decorative cover 48 which is left surrounding the pot 50 after the upper portion 30 of the sleeve 10 has been detached leaving the skirt portion 38 with the outer peripheral edge 60. It will be understood by a person of ordinary skill in the art that the embodiments of FIGS. 6 and 7 exemplify the combination of any of the sleeves described herein as will be obvious in light of the disclosure provided herewith.

It will generally be desired to use the sleeve 10 as the decorative cover 48 for a pot 50 having a floral grouping 58 (FIGS. 6–7). As shown in FIG. 6, the lower end 54 of the pot 50 is closed but may have holes (not shown) for permitting water drainage.

The term "pot" as used herein refers to any type of container used for holding a floral grouping or plant. Examples of pots, used in accordance with the present invention include, but not by way of limitation, clay pots, wooden pots, foam pots, plastic pots, pots made from natural and synthetic fibers, or any combination thereof. The pot 50 is adapted to receive the floral grouping 58. The floral grouping 58 may be disposed within the pot 50 along with a suitable growing medium described in further detail below, or other retaining medium, such as a floral foam. It will also be understood that the floral grouping 58, and any appropriate growing medium or other retaining medium, may be disposed in the sleeve 10 (or any other sleeve described herein) without a pot 50.

Figure 8:
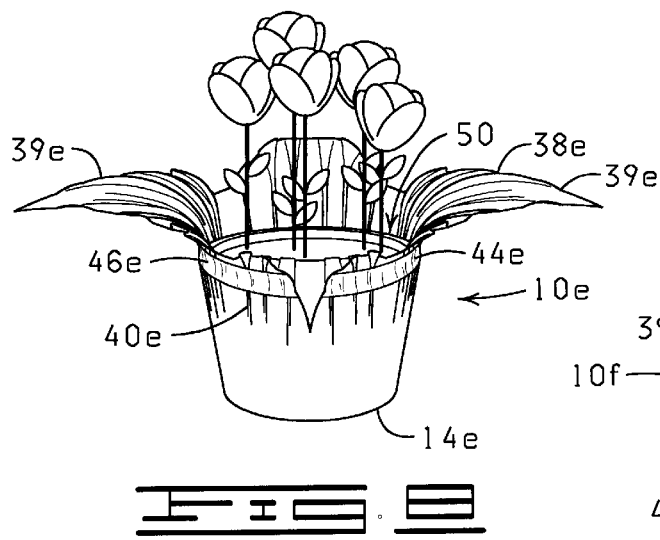
FIG. 8 is a perspective view of a sleeve having a potted plant therein the sleeve having folds which do not extend to the lower end of the sleeve.

Shown in FIG. 8 is a sleeve 10e, having a pot 50 therein. The sleeve 10e is similar to any of sleeves 10–10d described previously except expansion elements 40e extend various vertical distances and generally do not extend all the way from a skirt portion 38e (which has petal portions 39d) to a lower end 14e of the sleeve 10e. Sleeve 10e has a shrinkable element 44e which has been shrunk by a heat source to form a constricted area 46e.

As shown in FIGS. 1–8, the skirt portions 38–38e preferably comprise a plurality of petal portions 39–39e. It will be understood, however, that the design of the skirt portions 38–38e are not meant to be limited to a "petal" design and may be constructed in any number of other decorative patterns, such as a crenate or scalloped pattern, a crenulate toothed or zig-zag pattern, a crenelated or rectangular-shaped pattern, a diagonal pattern, or a curved or wavy non-linear pattern. One of ordinary skill in the art will understand these are but a few of the patterns that the perforations may form and one of ordinary skill could contemplate many other suitable patterns.

Figure 9:
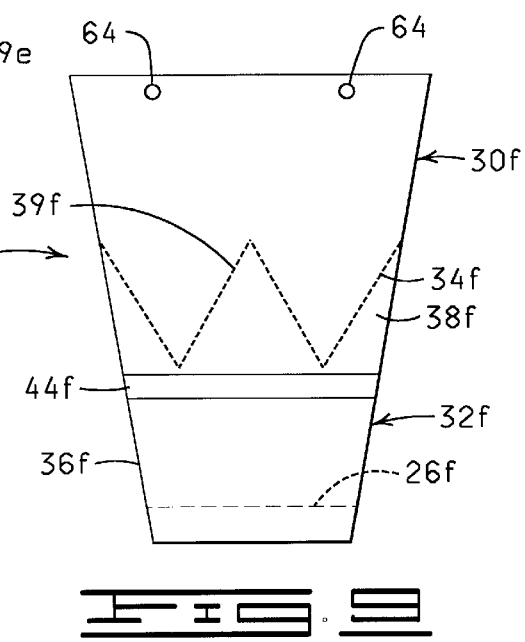
FIG. 9 is an elevational view of another sleeve constructed in accordance with the present invention wherein the sleeve is constructed without folds.

Shown in FIG. 9 is a sleeve designated by the general reference numeral 10f which is similar to sleeve 10 in having a lower portion 32f comprising a base portion 36f, a skirt portion 38f with petal portions 39f, an upper portion 30f which is detachable via a detaching element 34, a gusset 26f, apertures 64 in the upper portion 30f, and a shrinkable element 44f. Sleeve 10f differs from sleeve 10 primarily in its lack of expansion elements (except for the gusset 26f) in the base portion 36f, skirt portion 38f and upper portion 30f.

Similarly, sleeve 10g of FIG. 10 is similar to sleeve 10b of FIG. 3 except sleeve 10g lacks expansion elements, like sleeve 10f. Sleeve 10g has a base portion 36g, a skirt portion 38g having an outer peripheral edge 60g and petal portions 39g, a gusset 26g, and a shrinkable element 44g. Sleeve 10g has no detachable upper portion.

Sleeve 10h, shown in FIG. 11, is similar to sleeve 10f except sleeve 10h has a detaching element 34h which has a curved, non-linear pattern rather than an angular non-linear pattern. Sleeve 10h comprises a lower portion 32h comprising a gusset 26h, a base portion 36h and a skirt portion 38h having petal portions 39h, an upper portion 30h which is detachable via detaching element 34h, and a shrinkable element 44h.

Sleeve 10i shown in FIG. 12 is similar to sleeve 10g and has a gusset 26i, a base portion 36i, a skirt portion 38i having an outer peripheral edge 60i and petal portions 39i, and a shrinkable element 44i. Sleeve 10i lacks a detachable upper portion.

Shown in FIG. 13 is a sleeve 10j comprising a lower portion 32j comprising a base portion 36j and a skirt portion 38j having petal portions 39j, an upper portion 30j detachable via a detaching element 34j, and a shrinkable element 44j. Sleeve 10i is shown as containing a growing medium 66 disposed within the base portion 36j, without a pot 50, and supporting a floral grouping 58. The shrinkable element 44j has been shrunk to provide a constricted area 46j in a position above the growing medium 66.

It will be understood by a person of ordinary skill in the art that mechanical equipment and devices for forming floral sleeves are commercially available, and are well known to a person of ordinary skill in the art. The sleeves described herein may be formed by intermittently advancing two separate webs, one or two webs preformed in the form of a tube, or a single web folded double and sealing the longitudinal sides and bottom of the two facing panels then cutting the sleeve thus formed from the webs or web. Machines which can form sleeves from such single webs or pairs of webs are well within the knowledge of one of ordinary skill in the art.

Further in each of the cases described herein wherein a sleeve 10–10j is applied to the pot 50 or the pot 50 which is covered, the sleeve 10–10j may be applied thereto either by depositing the pot 50 downwardly into the open retaining space of the sleeve 10–10j, or the sleeve 10–10j may be brought upwardly about the pot 50 from below the pot 50.

The sleeves 10–10j are generally frusto-conically shaped, but the sleeves 10–10j may be, by way of example but not by way of limitation, cylindrical, frusto-conical, a combination of both frusto-conical and cylindrical, or any other shape, as long as the sleeves 10–10j function as described herein as noted above. Further, the sleeves 10–10j may comprise any shape, whether geometric, non-geometric, asymmetrical and/or fanciful as long as it functions in accordance with the present invention. The sleeves 10–10j may also be equipped with drainage holes (e.g., one or more holes) in a base portion or bottom thereof or ventilation holes (not shown) in the base portion or in an upper portion, or can be made from permeable or impermeable materials.

The material from which the sleeves 10–10j are constructed preferably has a thickness in a range from about 0.1 mil to about 30 mils. Often, the thickness of the sleeves 10–10j are in a range from about 0.5 mil to about 10 mils. Preferably, the sleeves 10–10j have a thickness in a range from about 1.0 mil to about 5 mils. More preferably, the sleeves 10–10j are constructed from a material which is flexible, semi-rigid, rigid, or any combination thereof. The sleeves 10–10j may be constructed of a single layer of material or a plurality of layers of the same or different types of materials. Any thickness of the material may be utilized as long as the material functions in accordance with the present invention as described herein. The layers of material comprising the sleeves 10–10j may be connected together or laminated or may be separate layers. Such materials used to construct the sleeves 10–10j are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeves 10–10j may be formed as described herein, and as long as the formed sleeves 10–10j may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeves 10–10j may be constructed from a sheet comprising two polymer films such as polypropylene. The material comprising the sleeves 10–10j may be connected together or laminated or may be separate layers. In an alternative embodiment, the sleeves 10–10j may be constructed from only one of the polymer films.

The sleeves 10–10j are constructed from any suitable material that is capable of being formed into a sleeve and wrapped about the pot 50 and the floral grouping 58 disposed therein. Preferably, the material comprises treated or untreated paper, metal foil, polymer film, non-polymer film, woven or unwoven fabric, synthetic or natural fabric, cardboard, fiber, cloth, burlap, or laminations or combinations thereof.

The term "polymer film" means a synthetic polymer such as a polypropylene or a naturally occurring polymer such as cellophane. A polymer film is relatively strong and not as subject to tearing (substantially non-tearable), as might be the case with paper or foil.

The material comprising the sleeves 10–10j may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to the upper and/or lower surface of the material comprising the sleeves 10–10j. Moreover, portions of the material used in constructing the sleeves 10–10j may vary in the combination of such characteristics. The material utilized for the sleeves 10–10j itself may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

The term "bonding material" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

It should be further noted that any of the various features of the versions of the present invention such as closure bonding areas, support extensions, handles, additional perforations, drainage holes, ventilation holes gussets, or combinations of material may be used alone or in combination as elements of any of the embodiments described herein.

Changes may be made in the construction and the operation of the various components, elements and assemblies described herein or in the steps or the sequence of steps of the methods described herein without departing from the spirit and scope of the invention as defined in the following claims.

What is claimed is:

1. A preformed sleeve for covering a pot, a floral grouping or a growing medium, comprising:
   a base portion having an upper end, a lower end, an outer peripheral surface, an inner peripheral surface, and an interior space when opened;
   a skirt portion extending from the upper end of the base portion;
   an upper portion extending from the skirt portion and detachable therefrom; and
   a shrinkable element disposed upon a portion of the base portion and/or skirt portion for forming a constricted area in a portion of the preformed sleeve in a position about the pot, floral grouping or growing medium after the preformed sleeve has been disposed about the pot, floral grouping or growing medium.

2. The preformed sleeve of claim 1 wherein the shrinkable element is constructed of a heat shrinkable material.

3. The preformed sleeve of claim 1 wherein the shrinkable element is disposed on the outer peripheral surface of the base portion.

4. The preformed sleeve of claim 1 wherein the shrinkable element is disposed on the inner peripheral surface of the base portion.

5. The preformed sleeve of claim 1 wherein the shrinkable element is an integral portion of the base portion.

6. The preformed sleeve of claim 1 wherein the base portion is further defined as being sized to substantially cover an outer peripheral surface of the pot.

7. The preformed sleeve of claim 1 further defined as constructed from a material having a thickness in a range of from about 0.1 mil to about 30 mils.

8. The preformed sleeve of claim 1 further defined as comprising a plurality of expansion elements therein for allowing expansion of the preformed sleeve to contain the pot.

9. The preformed sleeve of claim 1 further defined as constructed from a material selected from the group consisting of treated or untreated paper, metal foil, polymer film, non-polymer film, cardboard, fiber, cloth, burlap, and laminations or combinations thereof.

10. The preformed sleeve of claim 1 further comprising a gusset in the lower end of the base portion.

11. The preformed sleeve of claim 1 wherein the lower end of the base portion is closed.

12. The preformed sleeve of claim 1 wherein the upper portion is detachable via perforations in the preformed sleeve.

13. The preformed sleeve of claim 1 wherein the upper portion is sized to enclose a floral grouping disposed in the pot.

14. The preformed sleeve of claim 1 wherein the upper portion is adapted to support the preformed sleeve upon a support assembly.

15. A preformed sleeve for covering a pot, a floral grouping or a growing medium, comprising:
a base portion having an upper end, a lower end, an outer peripheral surface, an inner peripheral surface and an interior space when opened;
a skirt portion extending from the upper end of the base portion; and
a shrinkable element disposed upon a portion of the inner peripheral surface of the base portion for forming a constricted area in a portion of the preformed sleeve in a position about the pot, floral grouping or growing medium after the preformed sleeve has been disposed about the pot, floral grouping or growing medium.

16. The preformed sleeve of claim 15 wherein the shrinkable element is constructed of a heat shrinkable material.

17. A preformed sleeve for covering a pot, a floral grouping or a growing medium, comprising:
a base portion having an upper end, a lower end, an outer peripheral surface, an inner peripheral surface and an interior space when opened;
a skirt portion extending from the upper end of the base portion; and
a shrinkable element disposed upon a portion of the base portion for forming a constricted area in a portion of the preformed sleeve in a position about the pot, floral grouping or growing medium after the preformed sleeve has been disposed about the pot, floral grouping or growing medium wherein the shrinkable element is an integral portion of the base portion.

18. The preformed sleeve of claim 17 wherein the shrinkable element is constructed of a heat shrinkable material.

19. A preformed sleeve for covering a pot, a floral grouping or a growing medium, comprising:
a base portion having an upper end, a lower end, an outer peripheral surface, an inner peripheral surface and an interior space when opened;
a skirt portion extending from the upper end of the base portion; and
a shrinkable element disposed upon a portion of the base portion and/or skirt portion for forming a constricted area in a portion of the preformed sleeve in a position about the pot, floral grouping or growing medium after the preformed sleeve has been disposed about the pot, floral grouping or growing medium and wherein the preformed sleeve is constructed from a material having a thickness in a range of from 0.1 mil to about 30 mils.

20. The preformed sleeve of claim 19 wherein the shrinkable element is constructed of a heat shrinkable material.

21. A preformed sleeve for covering a pot, a floral grouping or a growing medium, comprising:
a base portion having an upper end, a lower end having a gusset, an outer peripheral surface, an inner peripheral surface and an interior space when opened;
a skirt portion extending from the upper end of the base portion; and
a shrinkable element disposed upon a portion of the base portion and/or skirt portion for forming a constricted area in a portion of the preformed sleeve in a position about the pot, floral grouping or growing medium after the preformed sleeve has been disposed about the pot, floral grouping or growing medium.

22. The preformed sleeve of claim 21 wherein the shrinkable element is constructed of a heat shrinkable material.

23. A preformed sleeve for covering a pot, a floral grouping or a growing medium, comprising:
a base portion having an upper end, a lower end, an outer peripheral surface, an inner peripheral surface and an interior space when opened;
a skirt portion extending from the upper end of the base portion; and
a shrinkable element disposed upon a portion of the base portion and/or skirt portion for forming a constricted area in a portion of the preformed sleeve in a position about the pot, floral grouping or growing medium after the preformed sleeve has been disposed about the pot, floral grouping or growing medium and wherein the preformed sleeve is constructed of metal foil, polymer film, non-polymer film, or fabric.

24. The preformed sleeve of claim 23 wherein the shrinkable element is constructed of a heat shrinkable material.

25. A preformed sleeve for covering a pot, a floral grouping or a growing medium, comprising:
a base portion having an upper end, a lower end, an outer peripheral surface, an inner peripheral surface, and an interior space when opened;
a skirt portion extending from the upper end of the base portion;
an upper portion extending from the skirt portion and detachable therefrom; and
a heat shrinkable element disposed upon a portion of the base portion and/or skirt portion for forming a constricted area in a portion of the preformed sleeve in a position about the pot, floral grouping or growing medium after the preformed sleeve has been disposed about the pot, floral grouping or growing medium.

26. The preformed sleeve of claim 25 wherein the heat shrinkable element is disposed on the outer peripheral surface of the base portion.

27. The preformed sleeve of claim 25 wherein the heat shrinkable element is disposed on the inner peripheral surface of the base portion.

28. The preformed sleeve of claim 25 wherein the heat shrinkable element is an integral portion of the base portion.

29. The preformed sleeve of claim 25 wherein the base portion is further defined as being sized to substantially cover an outer peripheral surface of the pot.

30. The preformed sleeve of claim 25 further defined as constructed from a material having a thickness in a range of from about 0.1 mil to about 30 mils.

31. The preformed sleeve of claim 25 further defined as comprising a plurality of expansion elements therein for allowing expansion of the preformed sleeve to contain the pot.

32. The preformed sleeve of claim 25 further defined as constructed from a material selected from the group consisting of treated or untreated paper, metal foil, polymer film, non-polymer film, cardboard, fiber, cloth, burlap, and laminations or combinations thereof.

33. The preformed sleeve of claim 25 further comprising a gusset in the lower end of the base portion.

34. The preformed sleeve of claim 25 wherein the lower end of the base portion is closed.

35. The preformed sleeve of claim 25 wherein the upper portion is detachable via perforations in the preformed sleeve.

36. The preformed sleeve of claim 25 wherein the upper portion is sized to enclose a floral grouping disposed in the pot.

37. The preformed sleeve of claim 25 wherein the upper portion is adapted to support the preformed sleeve upon a support assembly.

* * * * *